(No Model.)

J. WILLETTS & W. BUTTLEAR.
MANUFACTURE OF LAMP CHIMNEYS.

No. 285,719. Patented Sept. 25, 1883.

Witnesses
Jno K Smith
L. C. Fitler

Inventors
Jesse Willetts and William Buttlear
by their Attorneys
Bakewell & Kerr

UNITED STATES PATENT OFFICE.

JESSE WILLETTS AND WILLIAM BUTTLEAR, OF PITTSBURG, PENNSYLVANIA.

MANUFACTURE OF LAMP-CHIMNEYS.

SPECIFICATION forming part of Letters Patent No. 285,719, dated September 25, 1883.

Application filed July 12, 1883. (No model.)

*To all whom it may concern:*

Be it known that we, JESSE WILLETTS and WILLIAM BUTTLEAR, of Pittsburg, in the county of Allegheny and State of Pennsylvania, have invented a new and useful Improvement in the Manufacture of Lamp-Chimneys; and we do hereby declare the following to be a full, clear, and exact description thereof.

The lower ends of glass chimneys have ordinarily been formed by means of expansible tools—such as glass-makers' shears—which are inserted into the mouth of the chimney to give it the desired shape. When the shears are used, the chimney is so manipulated as to be brought to the form of a plain or flared cylinder. In forming chimneys having lower ends of a shape other than round it has been necessary to use molds. Molded chimneys, however, are not as capable of resisting changes of temperature as those made by hand. It is customary in forming a chimney with the shears to bring the end to the size of a gage, which is inserted in it from time to time, to obtain uniformity of product. This gage is of such a form as will not mark or indent the inner edges of the glass. It is impossible to open and form the end of a chimney over a solid plug, for the reason that the glass sticks to the surfaces of the same and becomes "crizzled," and the chimney distorted. Plugs having radial or longitudinal ribs or edges have been used for flaring and crimping the upper ends of the chimney; but such devices are not useful for forming the lower ends, for the reason that they indent or serrate the sides of the chimney.

Our invention consists of a plug for forming the lower ends of chimneys, so constructed that it will neither crizzle the glass nor distort or indent the article. This plug may be made of any form which it is desired to communicate to the chimney. Uniformity of manufacture is obtained by its use, because all the chimneys are formed upon it and take its shape. This obviates the necessity for a separate gage.

To enable others skilled in the art to make and use our invention, we will now describe it by reference to the accompanying drawings, in which—

Figure 1:
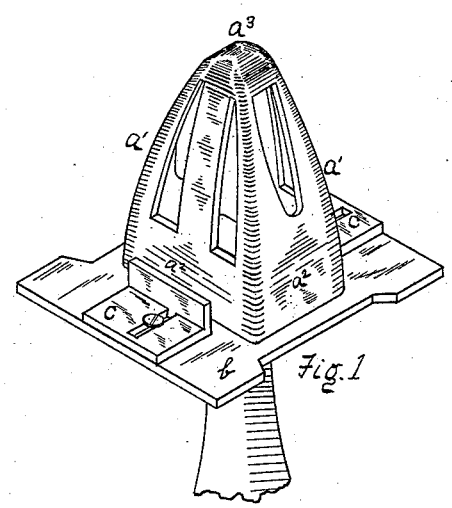
Figure 2:
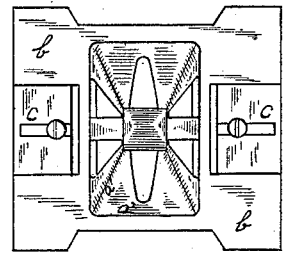
Figure 3:
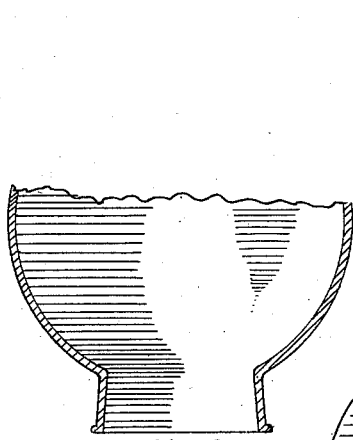
Figure 4:
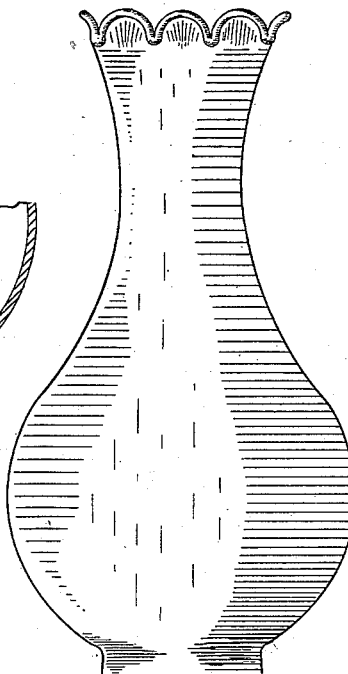
Figure 5:
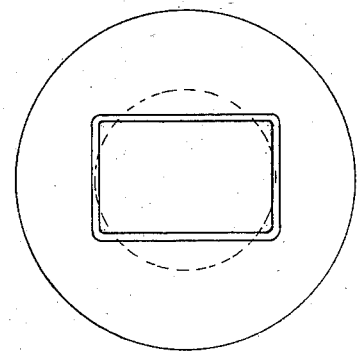

Figure 1 is a view of our improved plug for forming a square-sided chimney-base. Fig. 2 is a plan view. Figs. 3, 4, and 5 are views of the chimney formed thereon.

Like letters of reference indicate like parts in each.

The plug $a$ is made with ribs, corners, or edges $a'$, which are preferably rounded to prevent them cutting deeply into the plastic glass. At the base or lower end of the ribs $a'$ is a smooth ring-section, $a^2$, having no openings in it, and below the ring-section is a stop or base plate, $b$, the sides of which are provided with plates $c$, which constitute gages to prevent the lateral spread of the soft glass, and to square up the sides of the chimney-base. The form of the plug $a$ is tapering, so as to make a point, $a^3$, which enters easily into the contracted end of the unfinished chimney. The chimney being still on the pipe or held in a suitable tool, the workman takes the plug $a$ in his other hand and inserts it carefully into the lower end of the chimney. The tapered form of the plug causes the plastic glass to expand as the plug is inserted into it, and the corners, ribs, or edges $a'$ being the only points in contact with the glass, the latter will not stick to the plug and become distorted and crizzled. Such marks and indentations as are made in the lower end of the chimney by the passage of the corners or ribs $a'$ are obliterated by the smooth ring portion $a^2$, which constitutes a prolongation of the plug. The ring portion $a^2$ is made narrow and of the same or nearly the same diameter as the upper portion, and does not enlarge the article, and consequently no distortion or crizzling is produced thereby, while the smoothing or obliteration of the marks of the ribs $a'$ upon the glass is obtained without injury to the article.

We do not limit ourselves to any particular form of the ribbed plug, but claim such construction, in combination with the smooth base-ring, broadly, for the purpose specified. We prefer a hollow open plug with rounded edges—such as is shown in the drawings—as it produces a better article. If desired, however, the plug may be solid with longitudinal grooves forming the ribs or edges.

By changing the shape of the tool to suit, any desired form may be given to the base of the chimney. Practical experience has demonstrated our invention to be one of great utility. In making round-base chimneys a much less degree of skill is required in its use than has heretofore been necessary in the use of the shears, and it is just as easy to produce forms other than round as it is to make a round-base chimney. If a solid polygonal plug is used, the flat sides do not come in such intimate contact with the glass as to crizzle and distort it, because the corners relieve it and prevent its sticking thereto. We prefer, however, the construction shown in the drawings.

What we claim as our invention, and desire to secure by Letters Patent, is—

1. A tool for forming the base ends of chimneys and the open ends of other articles of glassware, consisting of a tapered plug having longitudinal ribs, edges, or corners, and a smooth ring or section at its base, of substantially the same diameter, constituting a prolongation of the plug, substantially as and for the purposes described.

2. A tapered plug having longitudinal ribs, edges, or corners, a smooth ring or section at the base, of substantially the same diameter, constituting a prolongation of the plug, and a stop-plate below the ring, substantially as and for the purposes described.

3. A tapered hollow plug having longitudinal ribs, edges, or corners, and a smooth ring or section at its base, of substantially the same diameter, constituting a prolongation of the plug, substantially as and for the purposes described.

In testimony whereof we have hereunto set our hands this 2d day of July, A. D. 1883.

JESSE WILLETTS.
WILLIAM BUTTLEAR.

Witnesses:
W. B. CORWIN,
T. B. KERR.